United States Patent
Shmueli

(10) Patent No.: US 9,538,207 B2
(45) Date of Patent: Jan. 3, 2017

(54) METHOD AND APPARATUS FOR MANAGING VIDEO STORAGE

(71) Applicant: NICE-SYSTEMS LTD., Ra'anana (IL)

(72) Inventor: Yaron Shmueli, Kfar-Saba (IL)

(73) Assignee: Qognify Ltd., Ra'anana (IL)

( * ) Notice: Subject to any disclaimer, the term of this patent is extended or adjusted under 35 U.S.C. 154(b) by 0 days.

(21) Appl. No.: 14/097,555

(22) Filed: Dec. 5, 2013

(65) Prior Publication Data

US 2015/0163532 A1    Jun. 11, 2015

(51) Int. Cl.
| | |
|---|---|
| *H04N 7/173* | (2011.01) |
| *H04N 21/234* | (2011.01) |
| *H04N 21/24* | (2011.01) |
| *H04N 21/2747* | (2011.01) |

(52) U.S. Cl.
CPC .. *H04N 21/23406* (2013.01); *H04N 21/23418* (2013.01); *H04N 21/2408* (2013.01); *H04N 21/2747* (2013.01)

(58) Field of Classification Search
CPC .................................. H04N 5/772; H04N 5/907
USPC .......................................................... 725/119
See application file for complete search history.

(56) References Cited

U.S. PATENT DOCUMENTS

| | | | |
|---|---|---|---|
| 6,629,285 B1* | 9/2003 | Gerendai et al. | 714/748 |
| 2002/0141740 A1* | 10/2002 | Matsui | 386/111 |
| 2011/0222412 A1* | 9/2011 | Kompella | 370/241.1 |
| 2014/0119243 A1* | 5/2014 | Oike | 370/260 |

* cited by examiner

*Primary Examiner* — Gigi L Dubasky
(74) *Attorney, Agent, or Firm* — Pearl Cohen Zedek Latzer Baratz LLP

(57) ABSTRACT

A system and method for managing video storage in a network including continuously receiving in real time, at a recording server, from an edge device having a local storage, a plurality of incoming packets pertaining to a video stream, determining that at least one packet of the video stream is missing, and retrieving from the edge device the missing packets stored in the local storage, while continuing receiving additional incoming packets pertaining to the video stream in real time.

17 Claims, 8 Drawing Sheets

METHOD AND APPARATUS FOR MANAGING VIDEO STORAGE

BACKGROUND

Video recordings of surveillance systems are typically carried out 24 hours a day, 7 days a week, 365 days a year. This may require the use of mass storage capacity and managing capabilities to gain the most efficient and reliable recording process. Organizations that utilize large numbers of surveillance cameras, such as casinos, airports, large banks or secured government institutions, are required to handle thousand of hours of real time video recordings.

Reliability of video recording is a critical issue for surveillance systems. Video recordings of surveillance systems may be used for the investigation of various events and in some situation may be used in the court of law as evidence. Thus, the video recording should be continuous with no substantial gaps that may disable reliable interpretation of the video.

It is known in the field of streaming that networks are prone to packet loss. According to Real-time Transport Protocol (RTP) the header of the packets includes a sequential number so that the receiver side would be able to detect packet loss. RTP is regarded as the primary standard for audio/video streaming in IP networks, however, the protocol does not specify any action on packet loss, or how packet loss is detected at the receiver side. For example, video steaming applications that do not require high reliability may allow some level of packet loss which may be considered negligible. This level of packet loss is unacceptable for applications that require high reliability of video streaming, such as surveillance systems.

Transmission Control Protocol (TCP) on the other hand, includes mechanisms to ensure that all of the packets would arrive to the receiver side by retransmitting lost packets. However, retransmission involves halting the sending of the next packets until the missing packets are received. This interruption in the transmission is not acceptable for real time streaming. User Datagram Protocol (UDP), is often selected for real-time systems that do not require high reliability, however, due to its real-time and low delay nature, it does not handle packet loss.

Video recordings of surveillance systems are typically performed using state of the art block based video compression algorithms such as H.263, Moving Picture Experts Group (MPEG) 2, H.264/MPEG-4 Advanced Video Coding (AVC), etc. Video block based compression algorithms typically generate compressed frames which act as reference frame to the next frame. Intra frames are frames that are compressed independently of other frames and therefore may be decoded independently. A GOP (group of pictures) is defined from an intra frame to the next intra frame in a stream. Inter frames, on the other hand, depend on previous frames (P-frames), either the previous intra or inter frames, and sometimes on both previous and next frames (B-frame), for compression at the encoder side and for decoding at the decoder side.

SUMMARY OF THE INVENTION

According to embodiments of the present invention, there is provided a method for managing video storage in a network, the method may include continuously receiving in real time, at a recording server, from an edge device having a local storage, a plurality of incoming packets pertaining to a video stream; determining that at least one packet of the video stream is missing, while continuing receiving additional incoming packets pertaining to the video stream in real time; and retrieving from the edge device the missing packets stored in the local storage, while continuing receiving additional incoming packets pertaining to the video stream in real time.

Furthermore, according to embodiments of the present invention, determining that at least one packet of the video stream is missing may include placing a group of the incoming packets in a reorder buffer, wherein each of the incoming packets comprise a sequence number, the sequence numbers indicative of the sequence of the packets; checking for sequentiality of the sequence numbers of the packets in the reorder buffer; and determining that at least one packet of the video stream is missing if at least one sequence number of the packets in the reorder buffer is missing.

Furthermore, according to embodiments of the present invention, retrieving from the edge device may include saving the packets that are received in real time at the recording server in recording buffers; and retrieving from the edge device packets pertaining to an entire recording buffer in which at least one packet of the video stream is missing.

Furthermore, according to embodiments of the present invention, the method may include determining a duration of a viewing time gap that is created in the video stream, during a time interval, because of the absence of the at least one missing packet of the video stream.

Furthermore, according to embodiments of the present invention, retrieving from the edge device may be performed only if the duration of the viewing time gap is larger than a predetermined viewing time gap threshold.

Furthermore, according to embodiments of the present invention, if a frame that is corrupted due the at least one missing packet is a reference frame, the viewing time gap may be determined by calculating the viewing time from the frame that is corrupted to a next intra frame.

Furthermore, according to embodiments of the present invention, the method may include calculating a gap value between a sequence number of a last received packet and a sequence number of a previously received packet; and determining that at least one packet is missing if the gap value is higher than a reorder threshold.

Furthermore, according to embodiments of the present invention, the method may include determining a number of missing packets in a time interval; and retrieving the missing packets from the edge device only if the number of missing packets is larger than a predetermined second threshold.

According to embodiments of the present invention, there is provided a recording server for managing video storage in a network, the recording server may include a processor configured to continuously receive in real time, from an edge device having a local storage, a plurality of incoming packets pertaining to a video stream; to determine that at least one packet of the video stream is missing while continuing receiving additional incoming packets pertaining to the video stream in real time; and to retrieve from the edge device the missing packets, while continuing receiving additional incoming packets pertaining to the video stream in real time.

Furthermore, according to embodiments of the present invention, the processor may be configured to determine that at least one packet of the video stream is missing by placing a group of the incoming packets in a reorder buffer, wherein each of the incoming packets comprise a sequence number, the sequence numbers indicative of the sequence of the packets; checking for sequentiality of the sequence numbers of the packets in the reorder buffer; and determining that at least one packet of the video stream is missing if at least one sequence number of the packets in the reorder buffer is missing.

Furthermore, according to embodiments of the present invention, the processor may be configured to save the packets that are received in real time at the recording server in recording buffers; and retrieve from the edge device packets pertaining to an entire recording buffer in which at least one packet of the video stream is missing.

Furthermore, according to embodiments of the present invention, the processor may be configured to determine a duration of a viewing time gap that is created in the video stream during a time interval because of the absence of the at least one missing packet of the video stream, by, if a frame that is corrupted due the at least one missing packet is a reference frame, calculating the viewing time from the frame that is corrupted to a next intra frame.

Furthermore, according to embodiments of the present invention, the processor may be configured to retrieve the missing packets only if the duration of the viewing time gap is larger than a predetermined viewing time gap threshold.

Furthermore, according to embodiments of the present invention, the processor may be configured to determine a number of missing packets in a time interval; and retrieve the missing packets from the edge device only if the number of missing packets is larger than a predetermined second threshold.

Furthermore, according to embodiments of the present invention, the recording server may include storage device for storing video streams, wherein the processor may be configured to store the video stream on the storage device.

According to embodiments of the present invention, there is provided a non-transitory computer-readable storage medium, having stored thereon instructions, that when executed on a processor, may cause the processor to continuously receive in real time, from an edge device having a local storage, a plurality of incoming packets pertaining to a video stream; to determine that at least one packet of the video stream is missing while continuing receiving additional incoming packets pertaining to the video stream in real time; and to retrieve from the edge device the missing packets that are stored in the local storage, while continuing receiving additional incoming packets pertaining to the video stream in real time.

Furthermore, according to embodiments of the present invention, the instructions, when executed, may cause the computer to determine that at least one packet of the video stream is missing by placing a group of the incoming packets in a reorder buffer, wherein each of the incoming packets comprise a sequence number, the sequence numbers indicative of the sequence of the packets; checking for sequentiality of the sequence numbers of the packets in the reorder buffer; and determining that at least one packet of the video stream is missing if at least one sequence number of the packets in the reorder buffer is missing.

Furthermore, according to embodiments of the present invention, the instructions, when executed, further may cause the computer to determine a duration of a viewing time gap that is created in the video stream, during a time interval, because of the absence of the at least one missing packet of the video stream, by, if a frame that is corrupted due the at least one missing packet is a reference frame, calculating the viewing time remaining from the frame that is corrupted to a next intra frame.

Furthermore, according to embodiments of the present invention, the instructions when executed may further cause the computer to retrieve from the edge device the missing packets only if the duration of the viewing time gap is larger than a predetermined gap threshold.

Furthermore, according to embodiments of the present invention, the instructions when executed may cause the computer to determine a number of missing packets in a time interval; and retrieve the missing packets from the edge device only if the number of missing packets is larger than a predetermined second threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
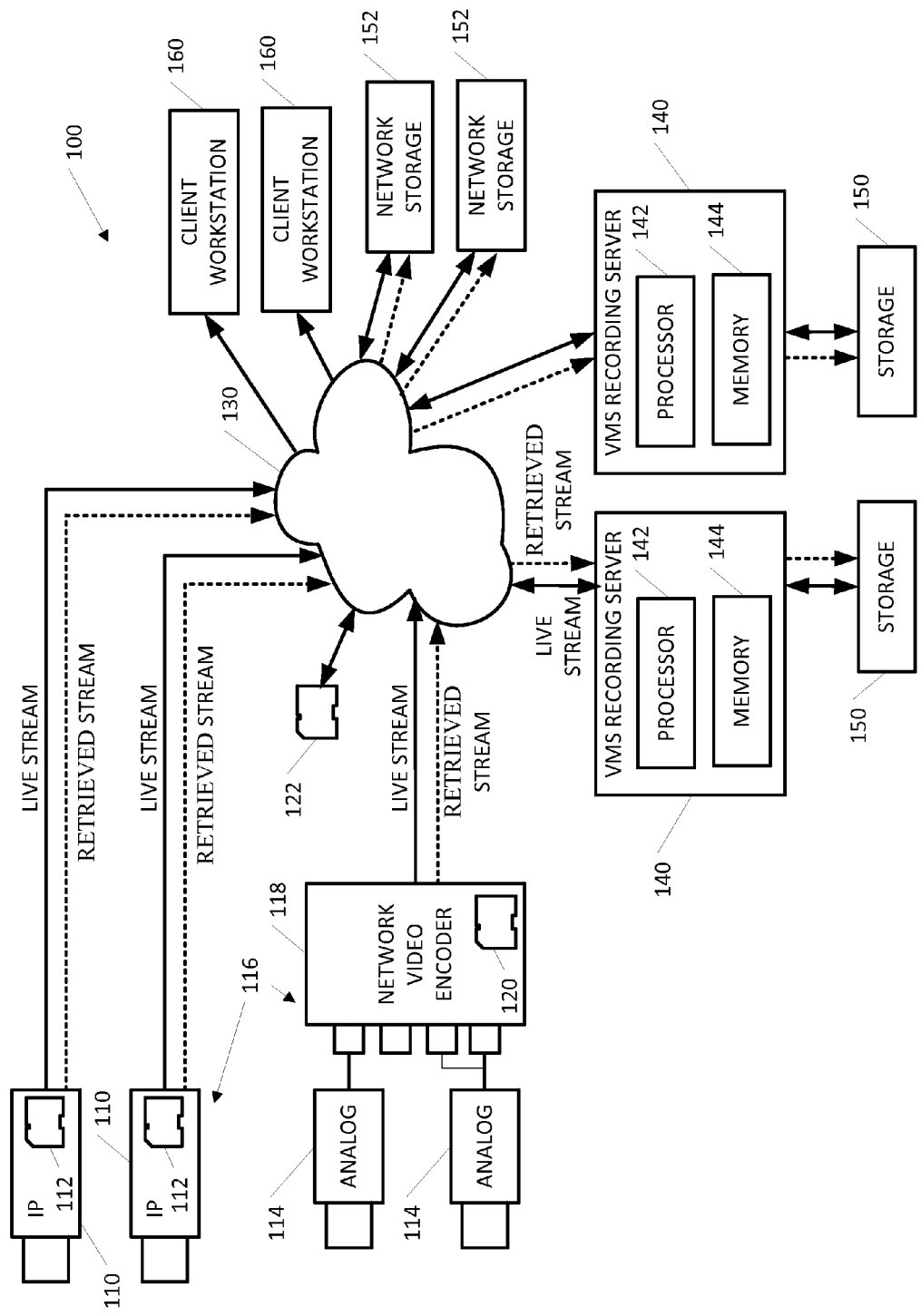
FIG. 1 is a high level block diagram of an exemplary video storage management system in accordance with some embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", allocating, "checking", "receiving", "selecting", "comparing", "reporting", "recording", "detecting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

As used herein, the term "storage unit" may refer to any apparatus, device, system and/or array of devices that is configured to store data, for example, video recordings. The storage unit may include a mass storage device, for example Secure Digital (SD) cards, an optical storage device such as a CD, a DVD, or a laser disk; a magnetic storage device such as a tape, a hard disk, Redundant Array of Independent Disks (RAID), Direct-Attached Storage (DAS), Storage Area Network (SAN), a Network Attached Storage (NAS), or the like. Each of the storage units may include the ability to write data to the storage and read the data from the storage unit for further use, e.g., video files may be read from the storage unit, upon a request, for example, when an investigation of an incident is required.

The storage units may be physically located in the organization facility(ies), for example, a plurality of hard disks physically located in the IT storage room, or may be available to the organization via a network connection, for example, Storage Area Network (SAN) or Network Attached Storage (NAS).

As used herein the term "organization" may refer to any organization, company, government institution, either profitable or non-profitable organization that may use a plurality of cameras (e.g., surveillance cameras) to monitor and record activities in a defined area which is under the supervision or influence of the organization. For example, the organization may be airports, police stations, jails, casinos, banks, department stores, companies, industrial facilities or hospitals.

Some embodiments of the invention may be related to recording, in real time, of video data captured by cameras, for example, cameras of a surveillance system. As used herein, capturing, streaming, receiving, storing or performing any other action on a video stream in real time relates to performing these actions on the video stream at substantially the same rate in which the video stream is captured. Thus, receiving of incoming packets of video stream that was captured over a certain time period may last substantially no more than that time period. The video data may be encoded and decoded (i.e., compressed and decompressed) according to any known or propriety video compression standard such as H. 264/MPEG-4, H.265, H. 263, MPEG2, etc., using any known video codec, for example, H. 264/MPEG-4 AVC, Microsoft, On2, H.265 or H. 263 codecs, etc.

Reference is now made to FIG. 1, which is a high-level block diagram of system 100 for capturing, managing and storing video recordings according to embodiments of the present invention. System 100 may include one or more edge video capturing devices or cameras, such as digital Internet protocol (IP) cameras 110 and/or analog cameras 114. Analog cameras 114 may be connected to network 130 through network video encoder 118 that may receive the analog video signals from analog cameras 114, convert them to digital video, compress the digital video and stream it to network 130. IP camera 110 may stream compressed digital video directly to network 130. Network video encoder 118 and IP cameras 110, referred herein as edge devices 116, may compress the video according to any known or propriety video compression standard such as H. 264, MPEG-4, H.265, H. 263, MPEG2, etc. It should be readily understood to those skilled in the art that system 100 may include only cameras of a single type, e.g. only IP cameras 110, or only analog cameras 114 (together with a network video encoder 118), or cameras of both types. Additionally, a plurality of analog cameras 114 may be connected to network 130 through a single network video encoder 118, or a single analog camera 114 may be connected to network 130 through a dedicated network video encoder 118.

Edge devices 116 may include edge local storage 112, 120 for recording video captured by IP cameras 110 and analog cameras 114, respectively. Additionally or alternatively, system 100 may include central storage 122 for storing video captured by IP cameras 110 and analog cameras 114 in, for example, a NAS configuration. Edge devices 116 may communicate with central storage 122 over a network, such as network 130, or a dedicated segment of network 130, using a lossless protocol, such as TCP. Edge local storage 112, 120 and central storage 122 may include any digital storage media, such as flash drives or cards such as SD cards or hard disk drives. Edge local storage 112, 120 may be used for storing captured video at edge devices, in addition to the video being transmitted or streamed to network 130, which may enable retrieving of video streams or packets when needed. Additionally or alternatively, system 100 may include central storage 122 for storing or retrieving of recorded video captured by IP cameras 110 and analog cameras 114.

System 100 may further include one or more video management system (VMS) recording server 140, referred to hereinafter as recording servers 140, configured to control edge devices 116, request video streams, record the video streams to storage units 150, 152 and distribute the streams to client workstations 160 either in real time as live video or as playback. Recording servers 140 may be managed by a user through client workstations 160. Recording servers 140 may support configuration of direct streaming of live video from edge device 116 to clients 160 via multicast for live monitoring.

System 100 may include storage units such as Direct-Attached Storage (DAS) units 150 and/or Network Storage units 152. Each of storage units 150, 152 may include one or more mass storage devices such as SD cards, optical storage devices such as CDs, DVDs, or laser disks; magnetic storage devices such as tapes, hard disks, Redundant Array of Independent Disks (RAID), or the like. Each of network storage units 152 may be configured as Storage Area Network (SAN) and/or Network Attached Storage (NAS).

Each of recording servers 140 may include processor 142 and memory unit 144. Processor 142 may be configured to execute commands included in a program, algorithm or code stored in memory 144. Processor 142 may include components such as, but not limited to, one or more central processing units (CPU) or any other suitable multi-purpose or specific processors or controllers, one or more input units, one or more output units or any other suitable hardware components and/or software components. Processor 142 may be any computation device that is configured to execute various operations included in some methods disclosed herein. Memory 144 may be a non-transitory computer-readable storage medium that may store thereon instructions that when executed by processor 142, cause processor 142 to perform operations and/or methods, for example, the method disclosed herein.

Edge devices 116, recording servers 140 and client workstations 160 may all be interconnected by network 130. Network 130 may be segmented and include a capture segment connecting edge devices 116 and recording servers 140, a viewing segment connecting recording servers 140 and clients 160 and a storage segment connecting recording servers 140 and storage units 150, 152. Network 130, or any segment of network 130, may be, may comprise, or may be part of any type of computer network that supports packet based video streaming, such as private IP network, the internet, a public or private data network, a local area network (LAN), a wide area network (WAN), a wireline or wireless network, a local, regional, or global communication network, an enterprise intranet, any combination of the preceding and/or any other suitable communication infrastructure.

In some applications, for example, surveillance applications, some or all of IP cameras 110 and analog cameras 114 may capture live video continuously. The live video may be streamed continuously, in real time, by edge devices 116 to recording servers 140 through network 130. The live video may be stored by recording servers 140 on storage units 150, 152. The live video captured by IP camera 110 may be saved locally on edge local storage 112. The live video captured by analog cameras 114 may be saved locally on edge local storage 120. The duration of the video that may be stored locally on edge local storage 112, 120 may vary according to system design. Typically, currently captured video frames replace the oldest video frames stored on edge local storage 112, 120 in a cyclic manner.

As is often the case in packet based networking, video packets may travel at different routes of the network from the source to the destination. Accordingly, recording server 140 may get the video packets from different network routes. The routes are not equally aligned so packets from the same stream may not arrive in the order they were transmitted. As video streaming is serial in its nature there is a need to reorder the packets to achieve back their serialization. If the needed reordering may not be achieved, e.g., if the system can not wait for missing packets because of latency constrains, the missing packets may be declared as lost. Additionally, there is a possibility that a packet would not arrive to its target destination at all and would be declared as a lost packet creating a gap in the packet sequence.

Figure 2:
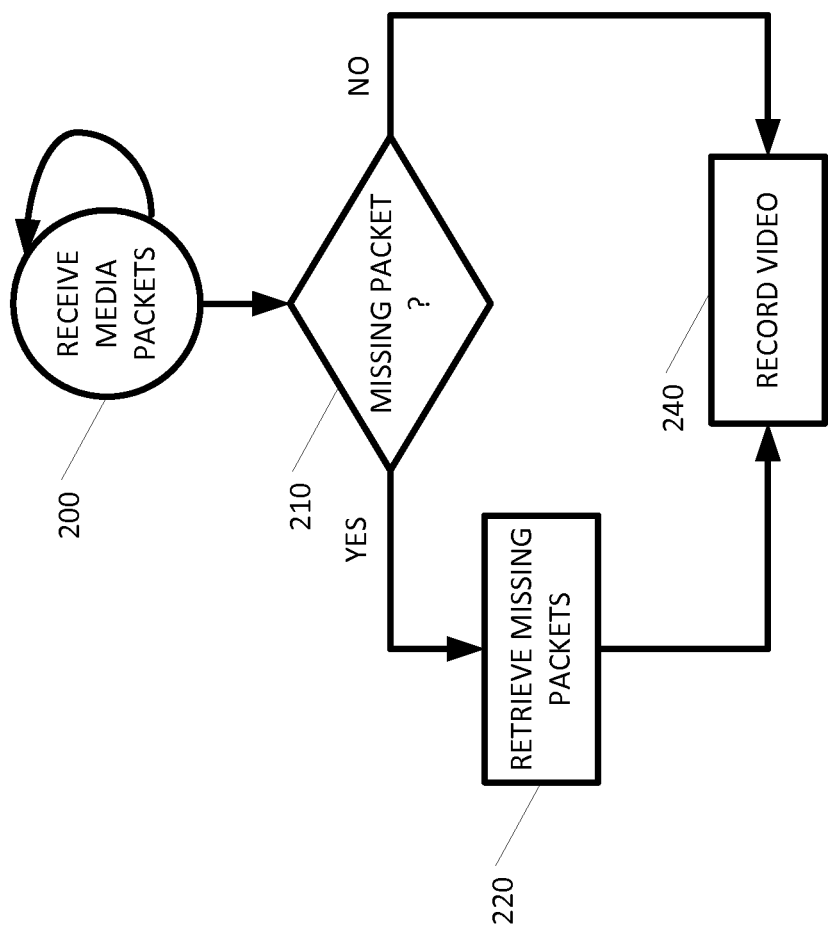
FIG. 2 is a flowchart diagram of a method for managing video storage according to some embodiments of the invention.

Reference is made to FIG. 2 which is a flowchart diagram of a method for managing video storage according to some embodiments of the invention. The embodiments described herein with reference to FIG. 2 may be executed by a processor or a controller, for example, by processor 142 of recording server 140. Processor 142 may execute instructions stored in memory 144 to perform the methods disclosed herein. Other systems may perform embodiments of the invention as well.

In operation 200, the method includes receiving a plurality of incoming packets at recording server such as recording server 140, from edge devices such as edge devices 116, the plurality of incoming packets may pertain to one or more video streams. The incoming packets are received continuously and in real time. Operation 200 continues uninterrupted while the other operations are taking place.

According to embodiments of the present invention, the real time live video streaming from edge devices 116 is not paused, stopped or interrupted by recording server 140 in case a packet is missing. Further, receiving of live video packets in real time by recording server 140 is not paused, stopped or interrupted in case a packet is missing. Instead, detection and retrieval of missing packets is performed in parallel to the continuous real time streaming of video, as will be explained in detail hereinbelow. According to some embodiments, the live streaming may be done by User Datagram Protocol (UDP) unicast and/or multicast streaming while retrieving of missing packets may be done by Transmission Control Protocol (TCP) as playback streaming from local storage 112, 120 of edge devices 116 and/or from central storage 122.

The detection and retrieval of missing packets in parallel to continuously streaming video in real time according to embodiments of the invention is of particular importance for recording systems that are required to record live video continuously, such as surveillance systems. If retrieving of missing packets would result in an interruption or pause in the streaming of live video from edge devices 116, captured scenes may be lost, which is unacceptable for surveillance systems.

In operation 210, the method includes determining that at least one packet of a video stream is lost or missing. As described hereinabove, detection of packet loss is performed while continuing receiving additional incoming packets pertaining to the one or more video streams in real time. According to some embodiments, determining that at least one packet of the video stream is missing may be performed by checking the sequentiality (e.g. the order) of the incoming packets of a video stream. Typically, a sequence number is embedded in a header of each of the packets of each video stream. The sequence number of each packet may be indicative of the relative location of that packet in a sequence of packets and the sequence numbers of a plurality of packets may be indicative of the sequence of the plurality of packets, as known in the art. Therefore, it may be determined that at least one packet of the video stream is missing if at least one sequence number of the packets of a certain video stream is missing. If no packet is missing, the video stream is recorded (box 240). If, however, at least one packet is missing, the method includes retrieving the missing packet from a respective edge device 116 (operation 220). Retrieving of missing packets may be done by requesting retransmission of the missing packets. According to embodiments of the present invention, retransmission of missing packets does not halt sending of the next packets until the missing packets are received. Instead, retransmission may be requested while continuing receiving additional incoming packets pertaining to the one or more video streams in real time. The retransmitted packets may be received at recording server 140 while continuing receiving additional incoming packets pertaining to the one or more video streams in real time. The retrieved packets may be united with the originally received stream and recorded (operation 240). In some embodiments of the present invention, only the missing packets are retrieved and upon arrival at recording server 140, they fill the respective gaps in the original video stream, and the repaired stream is recorded. Alternatively or additionally, packet groups that include the missing packets and other packets may be retrieved, as may be required according to design requirements.

According to some embodiments of the present invention, groups of packets received in real time at recording server 140 may be saved in recording buffers and recording buffers are arranged in files. Full files may be written to storage units 150 or 152. As used herein, recording buffers and files are data structures in memory e.g., of a predetermined size, that contain video data, for example compressed video, organized in a plurality of packets. Arranging packets in recording buffers and files enables some level of storage optimization that increases throughput. Writing small segments, e.g., single packets, to storage units 150 or 152 may result in a large overhead which may be reduced by writing large chunks of data e.g., files containing a plurality of packets, to storage units 150 or 152. If packet loss is detected and it is decided that the missing packet should be retrieved, the recording buffer in which the packet that is missing should have been saved, or a plurality of recording buffers pertaining to a single file in which the packet that is missing should have been saved, may be considered as corrupted and marked to be replaced with recording buffers and files that include corresponding packets received from the recording done on edge devices 116. Therefore, an entire content of a recording buffer or file in which a packet is missing may be retrieved to replace the corrupted recording buffer or file. According to some embodiments of the present invention only the missing packets may be retrieved.

It should be readily understood by those skilled in the art that there may be network disconnection which may occur before a file is considered full, e.g., before the file reaches a predetermined size. Once network 130 is restored, the video streams that are received in real time may be written into new files and in parallel, the video streams that were lost during the disconnection time may be retrieved from local storage 112, 120 and/or central storage 122 via edge devices 116. The retrieved video streams may complete the interrupted file and additional files as necessary.

Figure 3:
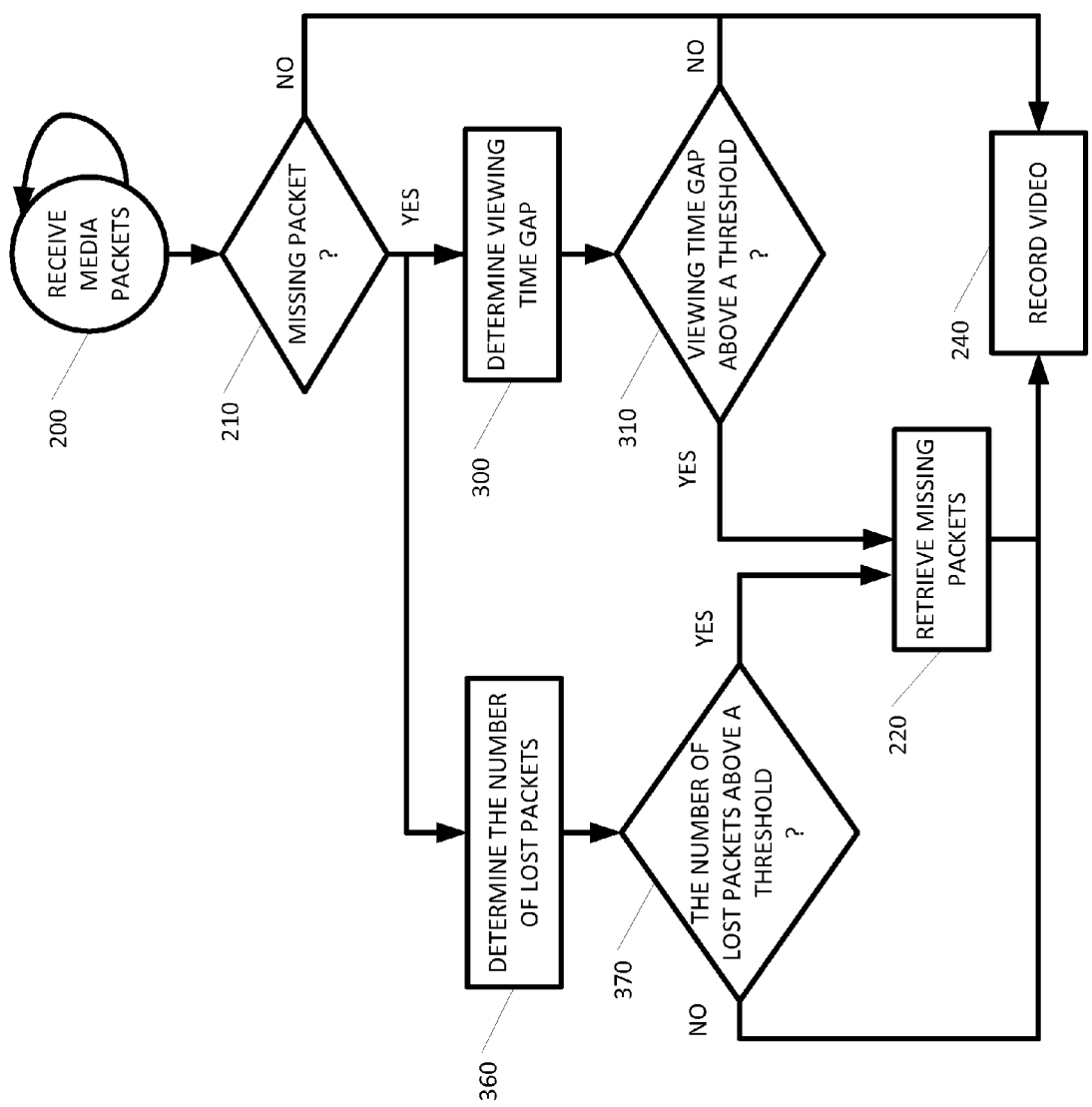
FIG. 3 is a flowchart diagram of a method for managing video storage according to some embodiments of the present invention.

Reference is made to FIG. 3 which is a flowchart diagram of a method for managing video storage according to some embodiments of the present invention. The embodiments described herein with reference to FIG. 3 may be executed by a processor or a controller, for example, by processor 142 of recording server 140. The method depicted in FIG. 3 is generally similar to the method depicted in FIG. 2 and accordingly similar operations are marked with similar numerals and will not be further discussed. In FIG. 3, however, the method includes determining the duration of a viewing time gap that is created in the video stream because of the absence of the missing packet of the video stream (operation 300) and checking if the duration of the viewing time gap is above a predetermined viewing time gap threshold (operation 310). As used herein the viewing time gap relates to the time, e.g., in seconds, that is lost from the recording due to the absence of the missing packet or packets. The method of FIG. 3 also includes determining the number of missing packets (operation 360) and checking if the number of missing packets is above a predetermined second threshold (operation 370). Retrieving the missing video packets (operation 220) may be executed only if the duration of the viewing time gap is above the viewing time gap threshold or if the number of missing packets is above the second threshold, or both. If, however, packets are missing but the duration of the viewing time gap is not above the predetermined viewing time gap threshold (operation 310), or if the number of missing packets is not above the predetermined second threshold (operation 370) the missing packet may be ignored.

According to some embodiments the minimum viewing time gap threshold may be set to the size of a GOP. The maximum value of the thresholds may be determined according to implementation constraints and storage retention of both edge devices 116 and recording server 140. The viewing time gap and the number of missing packets may be accumulated or integrated over a time interval of a predetermined duration, also referred to herein as a window. The viewing time gap and the number of missing packets may be reset to zero if no packets are missing during the time interval of the window.

It should be noted that the decision whether to retrieve missing packets may be based on either the viewing time gap in a time interval as in operations 300 and 310, or the number of missing packets in a time interval as in operations 360 and 370, or on both in any desired combination. For example, missing packets may be retrieved only if the duration of the viewing time gap is above the predetermined viewing time gap threshold, or only if the number of missing packets is above the predetermined second threshold, or only if both the viewing time gap and the number of missing packets are above their respective thresholds.

Block based compression algorithms like H.263, MPEG2, MPEG4, H.264, etc. generate compressed frames which act as reference frames to other frames of the GOP. Once there is a packet loss, a frame is corrupted and cannot be decoded. Additionally, the corrupted frame cannot be used as a reference for decoding of the next inter frames of the GOP. Decoding can be resumed only after a new intra frame is received. Consequently, if the frame that is corrupted due to the missing packet is used as a reference frame, the remaining frames of the GOP that are received before the next intra frame are lost as they are built from a faulty frame. Therefore, the duration (in time) of the viewing time gap created by a lost packet depends on the location of the frame that is corrupted or faulty, due to the packet loss, within its GOP. The viewing time of a GOP may depend on the number of frames in the GOP and on the frame rate of edge device 116. For example, for GOP size of 16 frames at 30 frames per second (FPS), a GOP viewing time is ½ second, while for 15 FPS, a GOP viewing time is 1 second. If a reference frame, e.g., an intra or forward Predicted frame (P-frame), is corrupted, the viewing time gap includes the time of the corrupted frame as well as the time of the rest of the GOP, as all of the frames are built one on top of the other. To calculate the duration of the viewing time gap the position of the corrupted frame within its GOP should be determined and the time left to the next intra frame (i.e. the time to the end of GOP) calculated.

The viewing time gap may be integrated over a predetermined time interval to include consecutive or substantially consecutive viewing time gaps that result from packet loss. Counting substantially consecutive viewing time gaps may relate to a situation in which there are many packets that are missing in a short time period, however these missing packets do not result in a consecutive viewing gap but rather in a "jumpy" video. Additionally or alternatively, a maximum allowed period of time between viewing gaps that may be considered as substantially consecutive may be determined according to system requirements. For example, it may be determined that at least one second of viewing time with no corrupted frames may reset the viewing time gap counter. Alternatively or additionally, it may be determined that at least one recording buffer or at least one file with no corrupted frames may reset the viewing time gap counter. When the viewing time gap is above a pre-define threshold, the recording buffer or buffers related to the corrupted frames may be marked for retrieval and replacement with the copy of these packets recorded on local storage 112, 120 and/or central storage 122.

Figure 4:
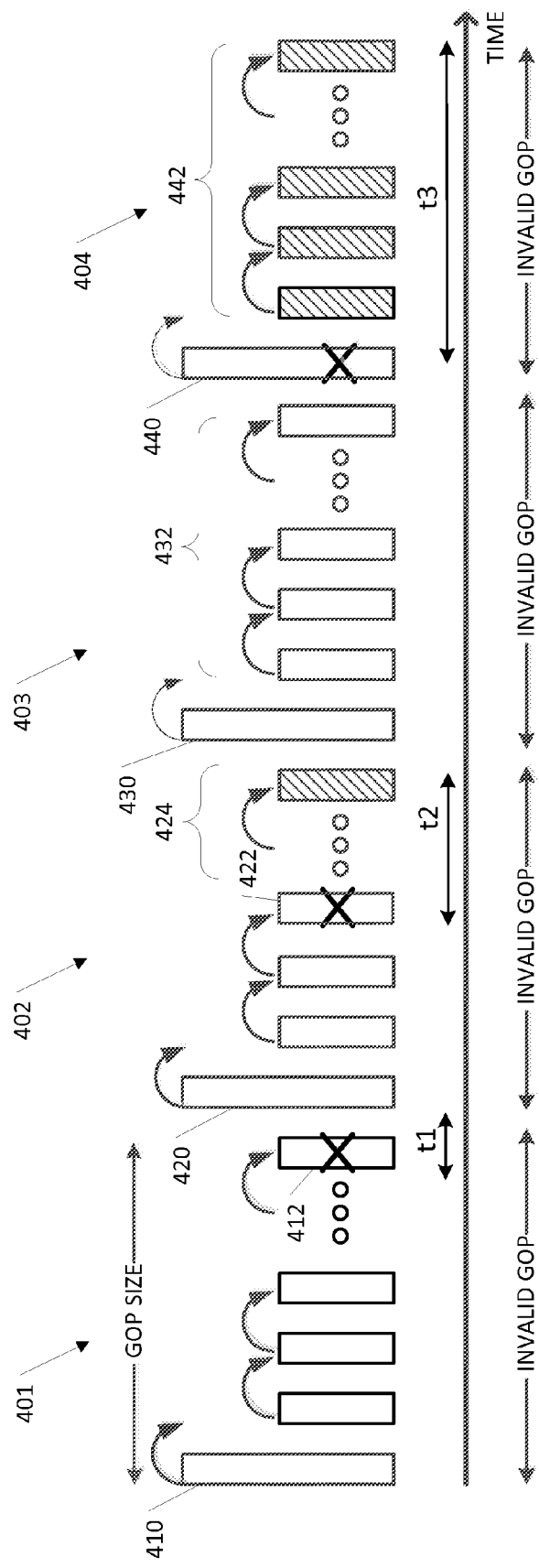
FIG. 4 schematically illustrates exemplary GOP's according to embodiments of the present invention.

The principle of determining the duration of the viewing time gap according to the location of the corrupted frame in the GOP is demonstrated in FIG. 4. FIG. 4 schematically illustrates four exemplary GOPs 401, 401, 403 and 404, each including a single intra frame 410, 420, 430 and 440, respectively. The intra frames 410, 420, 430 and 440 are the first frames of each GOP and are depicted as tall rectangles. Each intra frame 410, 420, 430 and 440 is followed by a plurality of inter frames, such as inter frames 432, that are depicted as short rectangles. The intra and inter frames that are corrupted due to missing packets are marked with a cross. Inter frames that cannot be decoded because they depend on corrupted frames, are marked with diagonal lines.

In GOP 401, the last inter frame 412 of the GOP is corrupted. However, since there are no inter frames that depend on this inter frame, the duration of the viewing time gap, marked as t1, that is created in the video stream due to the corruption of inter frame 412 equals the viewing time of a single frame. In GOP 402, inter frame 422 is corrupted due to packet loss. Here, all the inter frames 424 of GOP 402 that follow corrupted inter frame 422 cannot be decoded since they all depend on corrupted inter frame 422. Thus, the duration of the viewing time gap, marked as t2, that is created in the video stream due to the corruption of inter frame 422, equals the viewing time of frame 422 as well as the viewing time of all the inter frames 424 of GOP 402 that follow corrupted inter frame 422 before the next intra frame 430. In GOP 404 intra frame 440 is corrupted due to packet loss. In this case, all the inter frames 442 of GOP 404 cannot be decoded since they all depend on corrupted inter frame 440 and thus, the duration of the viewing time gap, marked as t3, that is created in the video stream due to the corruption of intra frame 440 equals the viewing time of the whole GOP. B-frames of a GOP may depend on both the preceding and following frames for decoding. Therefore, if a frame is corrupted, the viewing time of B-frames that precedes the corrupted frame and depend on it should be added to the viewing time gap of the corrupted frame. However, B-frames do not typically serve as reference frames. Therefore, if a B-frame is corrupted due to a lost packet, no other frames would be influenced and the viewing time gap would equal the viewing time of a single frame.

In surveillance applications with large GOP size, to avoid delays when initiating a new video display, the system may impose an intra frame at the middle of the GOP. The imposed intra frame typically replaces an inter frame. In some systems the imposing of the intra frame may change the GOP timing, e.g., the imposed intra frame may start a new GOP. For example, for GOP size of 4 frames, the frames may be organized in the following sequence:

IPPPIPPPIPPP

Where P indicates a P-frame and I indicates an intra frame. An imposed intra frame (marked as $I_{mp}$) may maintain the original sequence as in:

IPPPIPI$_{mp}$PIPPP

In this case, if the I or P frames of the GOP that immediately precedes $I_{mp}$ are corrupted, the viewing time gap that is created by the corrupted I or P frames may be calculated as the time to $I_{mp}$ or as the time to the next original intra frame. Alternatively, the imposed intra frame may start a new GOP as in:

IPPPIPI$_{mp}$PPPIPPP

In this case, if the I or P frames of the GOP that immediately precedes $I_{mp}$ are corrupted, the viewing time gap that is created by the corrupted I or P frames may be calculated as the time to $I_{mp}$.

Figure 5:
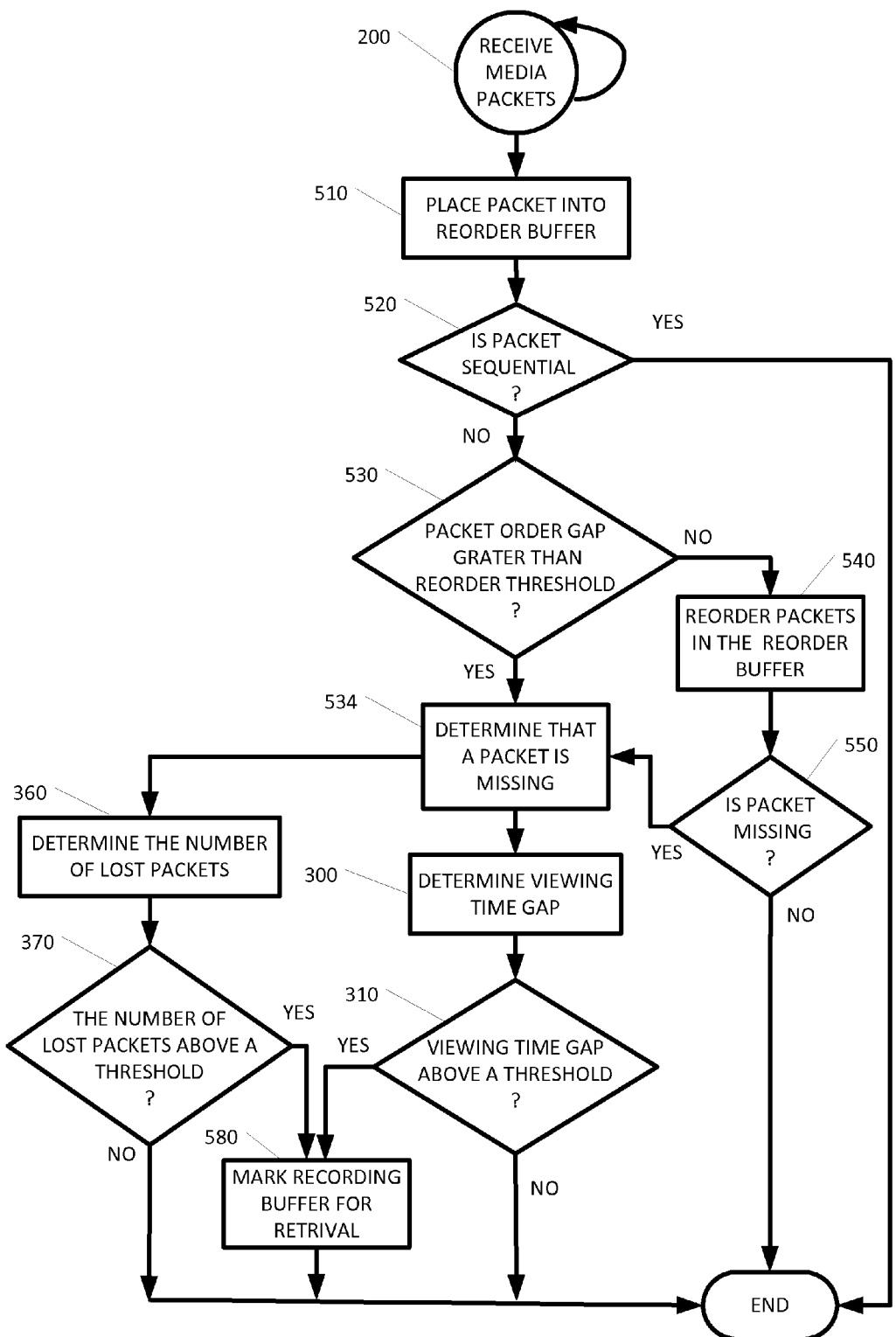
FIG. 5 is a flowchart diagram of a method for managing video storage according to some embodiments of the invention.

Reference is now made to FIG. 5 which is a flowchart diagram of a method for managing video storage according to some embodiments of the invention. The embodiments described herein with reference to FIG. 5 may be executed by a processor or a controller, for example, by processor 142 of recording server 140. Some operations of the method depicted in FIG. 5 may be similar to the operations of the method depicted in FIGS. 2 and 3 and are given the same reference numerals.

As in FIG. 2, in operation 200 a plurality of incoming packets are received at recording server 140, from edge devices 116, the plurality of incoming packets may pertain to one or more video streams. The incoming packets are received continuously and in real time. Operation 200 continues uninterrupted while the other operations are taking place.

In operation 510 the incoming packets are placed in a reorder buffer. The reorder buffer may be a software buffer that holds at least header information of the last incoming packets, and specifically the packets sequential numbers. The size of the reorder buffer is the maximum number of incoming packets that may be reordered if arrive not ordered at recording server 140. When a new incoming packet enters the reorder buffer, one packet is cleared from the reorder buffer into a recording buffer to be later stored in storage 150, 152. The aim of reorder buffer is to release packets in an ordered manner.

It should be noted that the size of the reorder buffer relates to the number of packets in the reorder buffer and not to the actual number of bytes of data in the reorder buffer. Typically, packet size is set according to the maximum transmission unit (MTU), which is around 1500 bytes of payload. However, smaller or bigger packets may be used. For example, some video streaming standards support jumbo packets of up to 9000 bytes of payload. The size of the reorder buffer has an effect on the latency of recording server 140. As the size of the reorder buffer increases, the latency increases. On the other hand, as the size of the reorder buffer increases more substantial reordering may be achieved and recording server 140 may wait longer for packets that did not arrive at the right order before determining that a packet is missing.

In operation 520, the method includes checking for sequentiality of the sequence numbers of the incoming packets in the reorder buffer. Each packet may include a sequence number indicative of the sequence of the packet in the video stream. The sequence number is typically located in a header of the video packet. The sequence numbers of the incoming packets in the reorder buffer may be checked for sequential order.

For example, the sequence numbers of the incoming packets may be checked for ascending sequence. If the sequence is broken, the new received packet sequence number may be compared to the sequence number of the previously received packet (operation 530). If the gap between the sequence number of the incoming packets is higher than a pre-defined value of a reorder threshold, it may be determined at this stage that a packet is missing (operation 534) since reordering may not be possible under the limitation of the size of the reorder buffer, e.g., recording server 140 may not be able to wait for the missing packets because of latency constrains. The reorder threshold may be related to the reorder buffer size and may define the depth of packet reordering allowed, e.g. packet order mismatch of more than the reorder threshold cannot be fixed and would be handled as packet loss.

If the gap between the sequence number of the incoming packets is not higher (i.e., is equal or less) than a pre-defined value of the reorder threshold, it may be reordered (operation 540), e.g., if the packets that fill the gap arrive within a time constrain that is related to the depth of the reorder buffer, the packets may be released from the reorder buffer in a sequential order. Thus, reordering may be performed after more packets are received and placed into the incoming buffer, e.g., after the packets that fill the gap in the sequential numbers are received and placed into the reorder buffer.

Figure 6:
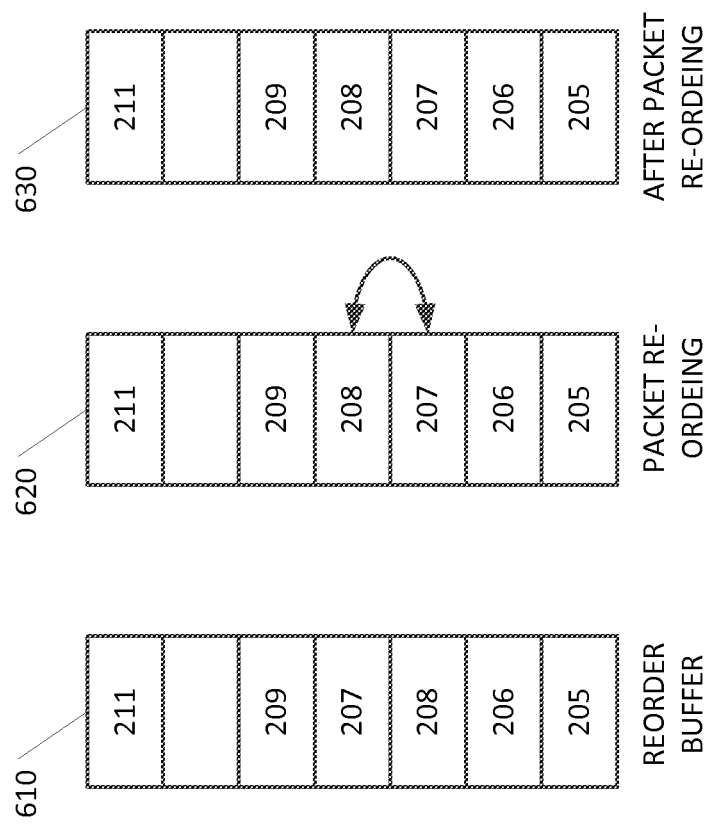
FIG. 6 demonstrates packet reordering according to some embodiments of the invention.

One option for packet reordering is demonstrated in FIG. 6. Initially, packets are stored in the reorder buffer 610 in the order in which they were received. It may be seen that the packets are not ordered in the order of their sequential numbers, as packet 208 follows packet 206 and comes before packet 207. Packet reordering requires switching locations of packets 207 and 208, as can be seen in buffer 620. After reordering, the packets in the reorder buffer 630 are arranged in sequential order of their sequential numbers. According to some embodiments of the present invention packet reordering may be performed when packets are released from the reorder buffer and copied to the recording buffer.

Returning now to FIG. 5, after reordering (operation 540), the sequence of the packets in the buffer may be checked for sequential order to determine if a packet is missing (operation 550). If the packets are sequential it may be determined that no packet is missing.

If the gap between last received packet sequence number and the sequence number of the previous packet is higher than the reorder threshold, it may be determined that packet is missing (operation 534). If a packet is missing, the duration of the viewing time gap of the video stream may be determined (operation 300) as described hereinabove. In operation 310, it is checked if the viewing time gap is above a predetermined viewing time gap threshold. If the viewing time gap is not higher than the viewing time gap threshold, the missing packet may be ignored. If, however, the viewing time gap is above the viewing time gap threshold, the corresponding recording buffer, e.g., the recording buffer that holds the group of packets where a packet is missing may be marked as corrupted (operation 580) and the video packets pertaining to that recording buffer may be later retrieved. Retrieval of video is performed in parallel to on going streaming and recording of live video in real time.

In operation 360, the number of missing packets in a time interval, or window, is determined. In operation 370, it is checked if the number of missing packets is above a predetermined threshold. If number of missing packets is not higher than the threshold, the missing packet may be ignored. If, however, the number of missing packets is above the threshold, the corresponding recording buffer, e.g., the recording buffer that holds the group of packets where a packet is missing may be marked as corrupted (operation 580) and the video packets pertaining to that recording buffer may be later retrieved.

It should be noted that marking a recording buffer as corrupted may be based on either the viewing time gap as in operations 300 and 310, or the number of missing packets in a time interval as in operations 360 and 370, or on both.

According to some embodiments of the invention, a plurality of recording buffers may be arranged in a single file and only then be recorded.

Figure 7:
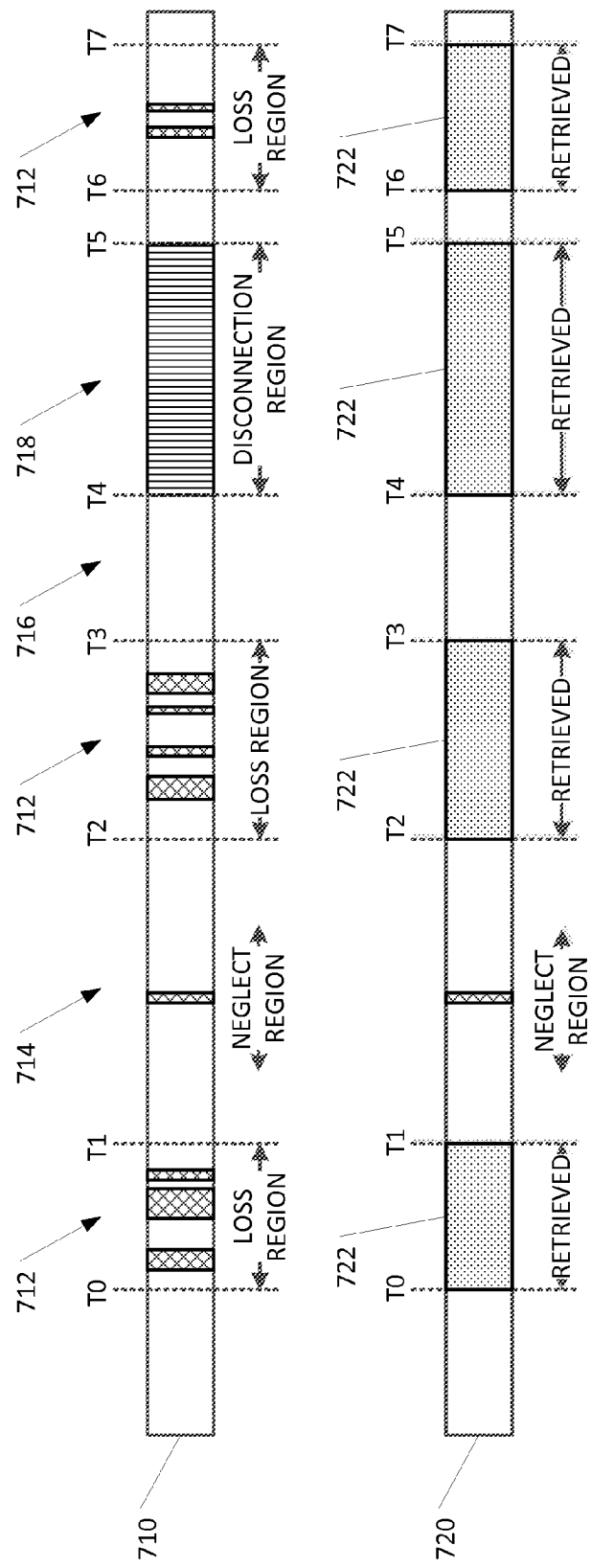
FIG. 7 schematically illustrates an exemplary video stream received at a VMS recorder, and the repaired video stream after retrieving missing packets, according to embodiments of the present invention.

Reference is now made to FIG. 7 which schematically illustrates an exemplary video stream 710 received at recording server 140, and the repaired video stream 720 after retrieving missing packets, according to embodiments of the present invention. Frames that are corrupted due to packet loss detected according to embodiments of the present invention are marked with squares. Frames that are lost due to packet loss that is a result of network discontinuation are marked with vertical lines. Regions 712 include corrupted frames due to packet loss detected according to embodiments of the present invention. In these regions the viewing time gap is larger than the viewing time threshold and thus packets are retrieved from edge devices 116. Retrieved frames 722 are marked on repaired video stream 720 with dots. In region 714 frames are corrupted due to packet loss detected according to embodiments of the present invention. However, in region 714, the viewing time gap is smaller than the viewing time threshold and thus packets are not retrieved from edge device 116. In region 718 packets are missing as result of network discontinuation. These packets are retrieved from edge devices 116. In region 716 no packets are missing.

Figure 8:
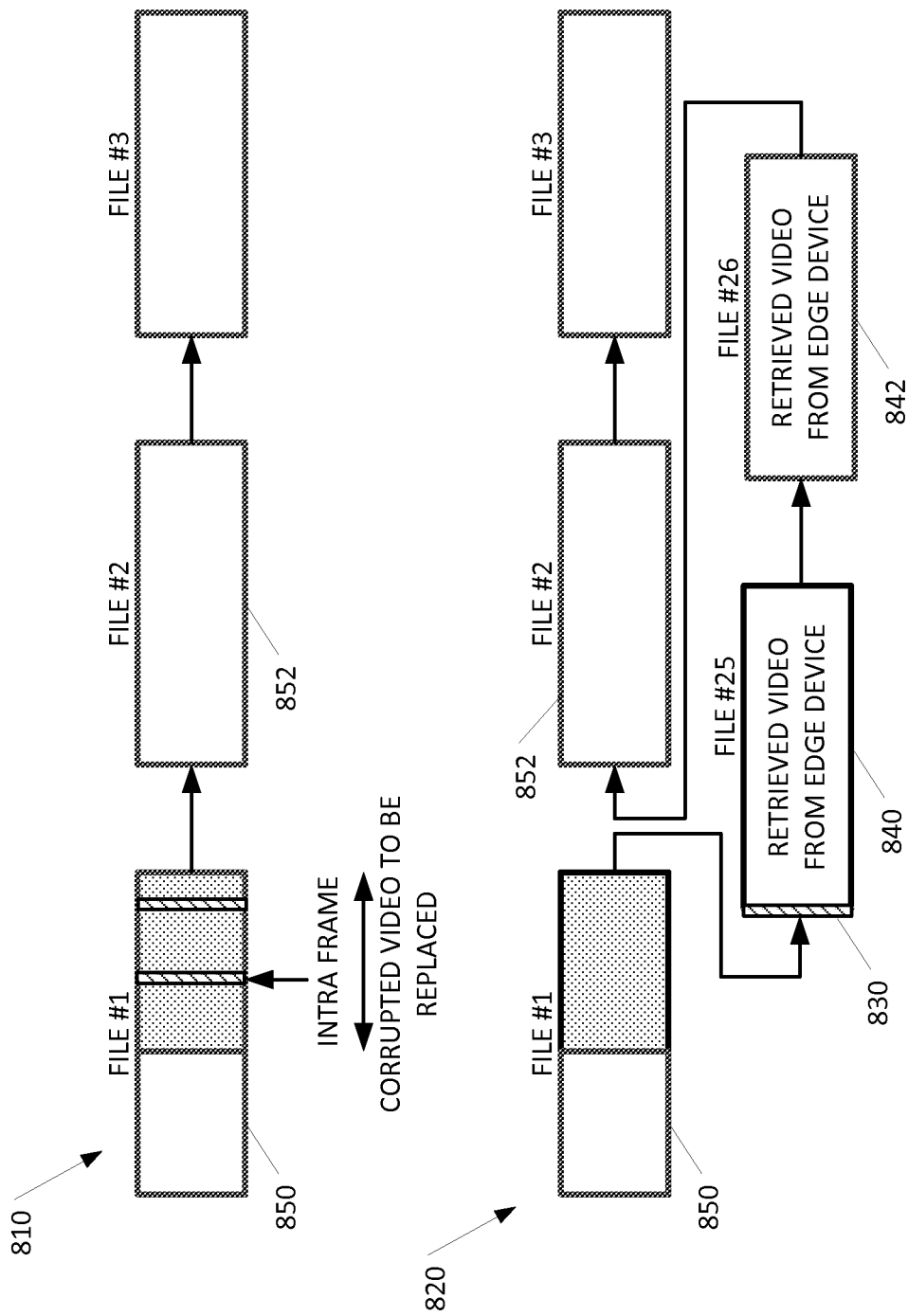
FIG. 8 schematically illustrates files created at a VMS recorder, and the repaired files after retrieving missing packets, according to embodiments of the present invention.

Reference is now made to FIG. 8 which schematically illustrates files 810 recorded by recording server 140 on storage 150 or 152, and repaired files 820 after retrieving missing packets, according to some embodiments of the present invention. Each of files 810 may be built from a plurality of recording buffers and each file may point to the location of the next file in storage 150 or 152. Video data that is corrupted due to packet loss detected according to embodiments of the present invention is dotted. Compressed intra frames are marked with diagonal lines. According to some embodiments of the present invention, files with compressed video, including the files 850 that include corrupted video or gaps in the video, are written to storage 150 or 152. Video stream that is recorded locally at edge devices 116 may not necessarily be synchronized with the streamed video in terms of intra frames location. The start point of GOPs at the stream that is recorded locally may be at different points in the stream than the start point of GOPs in the video that is streamed to network 130 for recording on storage 150 or 152. Therefore, the retrieved video stream, starting with an intra frame 830, would be stored on a new file 840. The corrupted video would be erased from file 850 where it was stored. File 850 may then hold only valid video and may point to new file/s 840, 842 generated from the video that was retrieved from edge devices 116. Once video retrieval is complete, the last file 842 would close the gap by pointing to the original recorded file 852 that followed the corrupted video.

While certain features of the invention have been illustrated and described herein, many modifications, substitutions, changes, and equivalents may occur to those skilled in the art. It is, therefore, to be understood that the appended claims are intended to cover all such modifications and changes that fall within the true spirit of the invention.

What is claimed is:

1. A method for managing video storage in a network comprising:
   continuously receiving in real time, at a recording server, from an edge device having a local storage, a plurality of incoming packets pertaining to a video stream, wherein the edge device is configured to stream the video stream in real time and to store captured video on the local storage;
   determining, by the recording server, that at least one packet of the video stream is missing, while continuing receiving additional incoming packets pertaining to the video stream in real time;
   determining, by the recording server, a time duration of a viewing time gap that is created in the video stream because of an absence of the at least one missing packet, wherein the time duration of the viewing time gap depends on a location of a frame that is corrupted due to the absence of the at least one missing packet, within a group of pictures (GOP);
   checking, by the recording server, if the time duration of the viewing time gap is above a predetermined viewing time gap threshold; and
   if the time duration of the viewing time gap is larger than the predetermined viewing time gap threshold, retrieving, by the recording server, from the edge device, the video included in the at least one missing packet stored in the local storage, while continuing receiving additional incoming packets pertaining to the video stream in real time.

2. The method of claim 1, wherein determining that at least one packet of the video stream is missing comprises:
   placing a group of the incoming packets in a reorder buffer, wherein each of the incoming packets comprise a sequence number, the sequence numbers indicative of the sequence of the packets;
   checking for sequentiality of the sequence numbers of the packets in the reorder buffer; and
   determining that at least one packet of the video stream is missing if at least one sequence number of the packets in the reorder buffer is missing.

3. The method of claim 2, comprising:
   calculating a gap value between a sequence number of a last received packet and a sequence number of a previous received packet; and
   determining that at least one packet is missing if the gap value is higher than a reorder threshold.

4. The method of claim 1, wherein retrieving from the edge device comprises:
   saving the packets that are received in real time at the recording server in recording buffers; and
   retrieving from the edge device packets pertaining to an entire recording buffer in which at least one packet of the video stream is missing.

5. The method of claim 1, wherein, if a frame that is corrupted due the at least one missing packet is a reference frame, the viewing time gap is determined by calculating the viewing time from the frame that is corrupted to a next intra frame.

6. The method of claim 1, comprising:
   continuously streaming in real time, by an edge device a plurality of packets pertaining to the video stream; and
   storing the captured video on the edge device, wherein the captured video stored on the edge device include at least one Group of Pictures (GOP).

7. The method of claim 1, wherein determining the time duration of the viewing time gap comprises:
   integrating the viewing time gap over a predetermined time interval.

8. The method of claim 1, wherein the method further comprises:
   imposing at least one intra frame at a selected GOP, wherein the viewing time gap that is created in the video stream because of the absence of the at least one missing packet is calculated according to one of: a time to a next intra frame and a time to the next imposed intra frame.

9. A recording server for managing video storage in a network, the recording server comprising:
   a memory and a processor configured to:
      continuously receive in real time, from an edge device having a local storage, a plurality of incoming packets pertaining to a video stream;
      determine that at least one packet of the video stream is missing while continuing receiving additional incoming packets pertaining to the video stream in real time;
      determine a time duration of a viewing time gap that is created in the video stream because of an absence of the at least one missing packet, wherein the time duration of the viewing time gap depends on a location of a frame that is corrupted due to the absence of the at least one missing packet, within a group of pictures (GOP);
      check if the time duration of the viewing time gap is above a predetermined viewing time gap threshold; and
      if the time duration of the viewing time gap is larger than the predetermined viewing time gap threshold, retrieve from the edge device the video included in the at least one missing packet stored in the local storage, while continuing receiving additional incoming packets pertaining to the video stream in real time.

10. The recording server of claim 9, wherein the processor configured to determine that at least one packet of the video stream is missing by:
    placing a group of the incoming packets in a reorder buffer, wherein each of the incoming packets comprise a sequence number, the sequence numbers indicative of the sequence of the packets;
    checking for sequentiality of the sequence numbers of the packets in the reorder buffer; and
    determining that at least one packet of the video stream is missing if at least one sequence number of the packets in the reorder buffer is missing.

11. The recording server of claim 9, wherein the processor is configured to:
    save the packets that are received in real time at the recording server in recording buffers; and
    retrieve from the edge device packets pertaining to an entire recording buffer in which at least one packet of the video stream is missing.

12. The recording server of claim 9, wherein the processor is to:
    determine a duration of a viewing time gap that is created in the video stream during a time interval because of the at least one missing packet of the video stream, by, if a frame that is corrupted due the at least one missing packet is an a reference frame, calculating the viewing time from the frame that is corrupted to a next intra frame.

13. The recording server of claim 9, comprising:
    storage device for storing video streams,
    wherein the processor is configured to:
       store the video stream and the video included in the at least one missing packet on the storage device.

14. A system for capturing, managing and storing video recordings, the system comprising:
a recording server according to claim 9; and
one or more edge devices each configured to:
continuously stream, in real time, a plurality of packets pertaining to the video stream; and
store captured video on the edge device, wherein the captured video stored on the edge device include at least one Group of Pictures (GOP).

15. A non-transitory computer-readable storage medium, having stored thereon instructions, that when executed on a processor, cause the processor to:
continuously receive in real time, from an edge device having a local storage, a plurality of incoming packets pertaining to a video stream;
determine that at least one packet of the video stream is missing while continuing receiving additional incoming packets pertaining to the video stream in real time;
determine a time duration of a viewing time gap that is created in the video stream because of an absence of the at least one missing packet, wherein the time duration of the viewing time gap depends on a location of a frame that is corrupted due to the absence of the at least one missing packet, within a group of pictures (GOP);
check if the time duration of the viewing time gap is above a predetermined viewing time gap threshold; and
if the time duration of the viewing time gap is larger than the predetermined viewing time gap threshold, retrieve from the edge device the video included in the at least one missing packet stored in the local storage, while continuing receiving additional incoming packets pertaining to the video stream in real time.

16. The non-transitory computer-readable storage medium of claim 15, wherein the instructions when executed cause the computer to determine that at least one packet of the video stream is missing by:
placing a group of the incoming packets in a reorder buffer, wherein each of the incoming packets comprise a sequence number, the sequence numbers indicative of the sequence of the packets;
checking for sequentiality of the sequence numbers of the packets in the reorder buffer; and
determining that at least one packet of the video stream is missing if at least one sequence number of the packets in the reorder buffer is missing.

17. The non-transitory computer-readable storage medium of claim 15, wherein the instructions when executed further cause the computer to:
determine a duration of a viewing time gap that is created in the video stream, during a time interval, because of the at least one missing packet of the video stream by, if a frame that is corrupted due the at least one missing packet is a reference frame, calculating the viewing time remaining from the frame that is corrupted to a next intra frame.

\* \* \* \* \*